United States Patent [19]

Noda et al.

[11] Patent Number: 4,520,071

[45] Date of Patent: May 28, 1985

[54] SPHERICAL POROUS POLYIMIDE POWDER

[75] Inventors: Yuzuru Noda; Toshio Nakajima, both of Osaka, Japan

[73] Assignee: Nitto Electric Industrial Co., Ltd., Osaka, Japan

[21] Appl. No.: 616,760

[22] Filed: Jun. 4, 1984

[30] Foreign Application Priority Data

Apr. 18, 1984 [JP] Japan ................................ 59-78936

[51] Int. Cl.³ .............................................. B32B 5/16
[52] U.S. Cl. ................................ 428/402; 428/473.5; 521/56; 521/60; 521/180; 521/183; 521/184; 521/185; 521/189
[58] Field of Search ............... 428/402, 473.5; 521/56, 521/60, 180, 183, 184, 185, 189

[56] References Cited

U.S. PATENT DOCUMENTS

| | | |
|---|---|---|
| 4,296,208 | 10/1981 | Gagliani et al. ...................... 521/77 |
| 4,315,076 | 2/1982 | Gagliani et al. .................... 521/189 |
| 4,315,077 | 2/1982 | Gagliani et al. .................... 521/189 |
| 4,332,656 | 6/1982 | Gagliani et al. .................... 521/189 |
| 4,355,120 | 10/1982 | Gagliani et al. .................... 521/189 |
| 4,394,464 | 7/1983 | Gagliani et al. .................... 521/189 |
| 4,425,441 | 1/1984 | Gagliani et al. ..................... 521/56 |
| 4,426,463 | 1/1984 | Gagliani et al. .................... 521/189 |

*Primary Examiner*—Morton Foelak
*Attorney, Agent, or Firm*—Sughrue, Mion, Zinn, Macpeak, and Seas

[57] ABSTRACT

A spherical porous polyimide powder which is thermally infusible and is insoluble in an organic solvent, comprising spherical porous particles of a weight average particle diameter of 1 to 20 μm comprising an aromatic polyimide having an inherent viscosity measured in sulfuric acid at a concentration of 0.5 g/dl at temperature of 30±0.01° C. of 0.1 to 2.0, wherein a packed bulk density is 100 to 600 g/l and a specific surface area measured by a nitrogen absorption method is 1 m²/g or more.

10 Claims, 5 Drawing Figures

SPHERICAL POROUS POLYIMIDE POWDER

FIELD OF THE INVENTION

The present invention relates to a spherical porous polyimide power which is thermally infusible and is insoluble in organic solvents (hereinafter referred to "infusible and insoluble polyimide powder," for brevity).

BACKGROUND OF THE INVENTION

Infusible and insoluble polyimide powder has been produced by (1) polymerizing a corresponding tetracarboxylic acid dianhydride and a diamine in an organic solvent under heating to prepare a solution of a polyamide acid which is a precursor of polyimide; (2) introducing this solution into a solvent such as water which does not solubilize the polymer; (3) collecting the resulting precipitate; (4) heating the precipitate for ring closure to form a polyimide; and (5) mechanically crushing the polyimide.

The infusible and insoluble polyimide powder has also been prepared by (1) polymerizing, under heating, a corresponding tetracarboxylic acid dianhydride and a diamine in a solvent such as ethylene glycol which does not solubilize the polymer to form a slurry of polyamide acid; (2) filtering out the polyamide acid from the slurry; (3) heating the filtered polyamide acid for ring closure to form a polyimide; and (4) crushing the polyimide.

In the above processes, polyamide acid, which is a precursor of polyimide, is prepared first and then the polyamide acid is turned into polyimide through ring closure with heating and the resulting polyimide is crushed into fine particles. These steps are employed because the direct polymerization of a tetracarboxylic acid dianhydride and a diamine does not proceed smoothly due to the formation of gel-like polyimide which cannot be easily discharged and crushed.

The above-described processes are industrially disadvantageous because complex processing steps are required, the resulting powder tends to be coarse, and a special pulverizing technique is required for producing fine particles.

Further, polyimide powder is required to be spherical on its use and it has been difficult to obtain such a spherical polyimide powder by the above-described processes.

A process for producing polyimide powder which is thermally flowable (i.e., thermoplastic property) and sometimes soluble in organic solvents has been developed. In this process, the polymerization reaction is carried out in a polar solvent for 3,3',4,4'-benzophenonetetracarboxylic acid dianhydride and a diisocyanate mixture of tolylene diisocyanate and diphenylmethane-4,4'-diisocyanate, to directly form a slurry or solution of polyimide. The slurry or solution of polyimide is then introduced into a solvent such as acetone or isopropyl alcohol for precipitation. The precipitate is then filtered out and crushed.

If the diisocyanate mixture in the above process described contains less than 70 mol% tolylene diisocyanate, the polymerization reaction forms the polyimide in the form of slurry. Further, if the diisocyanate mixture contains more than 70 mol% tolylene diisocyanate, the polymerization reaction forms the polyimide in the form of solution.

The above-described process is intended to prevent the formation of a gel and to produce polyimide directly by replacing the diamine component with the diisocyanate component. It is simpler than the process of forming polyamide acid and then turning it into a polyimide through ring closure with heating.

However, the above-described process is essentially the same as the conventional process for preparing infusible and insoluble polyimide powder because it employs the indispensable steps of preparing a slurry or solution of polyimide, introducing the slurry or solution into a solvent which does not solubilize the polymer such as acetone or isopropyl alcohol, filtering the precipitate, and drying and crushing the precipitate. Moreover, such a process does not readily provide polyimide powder of fine particles. Additionally, such a process is also difficult to provide a spherical polyimide powder.

Further investigation has been made on a process for industrially advantageously obtaining an infusible and insoluble polyimide polymer which is fine particle and spherical form, it has been found that when a tetracarboxylic acid dianhydride and polyisocyanate which are capable of forming an infusible and insoluble polyimide are appropriately selected and polymerized in an organic solvent under heating at a specific temperature range to precipitate the polyimide particles, polyimide powder in the form of fine particles can be obtained by merely filtering or centrifuging the precipitates, followed by washing. This process is proposed in Japanese patent application No. 217619/82 corresponding to U.S. patent application Ser. No. 560,304 filed on Dec. 12, 1983.

SUMMARY OF THE INVENTION

The present invention is based on the novel finding that polyimide powder obtained by employing a more limited specific manner has specific properties which have not been conventionally known and due to such specific properties, can be widely used in various purposes.

Accordingly, an object of the present invention is to provide a spherical porous polyimide powder which is thermally infusible and is insoluble in organic solvent, comprising spherical porous particles of a weight average particle diameter of 1 to 20 $\mu$m comprising an aromatic polyimide having an inherent viscosity measured in sulfuric acid at a concentration of 0.5 g/l at temperature of 30±0.01° C. of 0.1 to 2.0, wherein a packed bulk density is 100 to 600 g/l and a specific surface area measured by a nitrogen adsorption method is 1 m²/g or more.

DETAILED DESCRIPTION OF THE INVENTION

Figure 1:
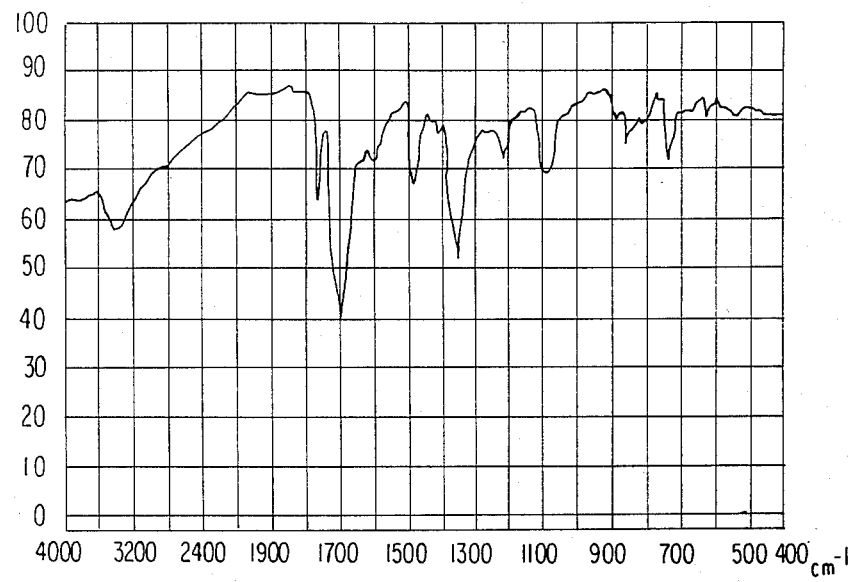
FIGS. 1 to 3 are graphs showing infrared absorption spectra of polyimide powder according to the present invention.

The polyimide powder according to the present invention has a fine particle form and is spherical and porous.

As the representative characteristic values, the polyimide powder must have a weight average particle diameter of 1 to 20 μm, a packed bulk density of 600 g/l or less and a specific surface area measured by a nitrogen adsorption method of 1 m²/g or more. If those values are outside the above specified ranges, particularly if the packed bulk density and specific surface area are outside the above ranges, the characteristic to be spherical and porous is lost.

Another characteristic of the polyimide powder according to the present invention is that the porosity of the polyimide powder is controlled to the specific range. This characteristic is defined by that the packed bulk density is 100 g/l or more. This characteristic has an important significance in connection with the fact that the polyimide which constitutes the polyimide powder has the inherent viscosity of the specified range, i.e., the polyimide has a relatively low degree of polymerization.

The polyimide which constitutes the polyimide powder has a relatively low degree of polymerization. Therefore, if the degree of porosity is too large, the polyimide powder has a poor mechanical strength and is difficult to maintain its particle form by crushing or aggregation during handling. Further, in the case of using such a polyimide powder as a filler for other polymers, the kneading is difficult, resulting in poor uniform dispersion. Moreover, in some cases the characteristics to be spherical and porous are lost.

On the other hand, the polyimide powder according to the present invention specifies the porosity such that the packed bulk density is 100 g/l or more. Therefore, the mechanical strength is not remarkably deteriorated.

Thus, the polyimide powder according to the present invention has specific properties which have not conventionally been known and due to such specific properties, is of great value as additives of paste-like compositions for giving thixotropic property by dispersing such into various varnishes or as additives for lubricants. In particular, when used as additives as above, good results can be obtained in improving dispersability into a binder and thixotropic property and also improving adhesion strength or bonding strength to binder. The polyimide powder of the present invention can also be advantageously used as column fillers for liquid chromatography and adsorbents of oil component in the field of foods.

Inherent viscosity, weight average particle diameter, packed bulk density and specific surface area used herein with respect to the polyimide powder are measured by the following method.

Inherent Viscosity

Using sulfuric acid as a solvent for dissolving polyimide and calculating in accordance with the following equation at a temperature of 30±0.01° C.

Inherent viscosity $(\eta \text{ inh}) = \ln(t/t_o)/C$ ln: Natural logarithm
t: Falling time of polymer solution measured by Ostwald viscometer
$t_o$: Falling time of solvent measured by Ostwald viscometer
C: Polymer concentration (0.5 g/dl)

Weight Average Particle Diameter

Obtaining a weight cumulative distribution using a light transmission type particle distribution measuring instrument (e.g., SKN-500 Model, a product of Seishin Kigyo Co.) and calculating a particle diameter of 50 wt% distribution as a weight average particle diameter.

Bulk Density

Packed bulk density measured by a powder tester manufactured by, e.g., Hosokawa Funtai Kogaku Kenkyujo.

Specific Surface Area

Measured by a nitrogen adsorption method, e.g., a value measured by Specific Surface Area-Pore Distribution Analyzer "Accusorb 2100-02," manufactured by Micromeritics Co.

The properties of the polyimide powder according to the present invention are explained in detail below.

The polyimide has an inherent viscosity of 0.1 to 2.0, preferably 0.2 to 1.0, most preferably 0.3 to 0.8. If the inherent viscosity is less than 0.1, the properties of polyimide are not exhibited. If the inherent viscosity exceed 2.0, it is preferred on the inherent properties of polyimide, but the production of a polyimide powder having such an inherent viscosity and also the above-described properties is difficult.

The polyimide powder of the present invention has a weight average particle diameter of 1 to 20 μm, preferably 1 to 15 μm, most preferably 1 to 10 μm. If the particle diameter is less than 1 μm, the powder is too fine and lacks its usefulness. Also, it is difficult to obtain a powder having the desired properties. On the other hand, it is possible to obtain a powder having the particle diameter exceeding 20 μm, but a powder having such a large particle diameter lacks its useful value. The object of the present invention is to provide a polyimide powder in the form of fine particles having a weight average particle diameter of 20 μm or less.

Other important properties of the polyimide powder of the present invention are packed bulk density and specific surface area. The polyimide powder of the present invention has a packed bulk density of 100 to 600 g/l, preferably 200 to 500 g/l, most preferably 300 to 400 g/l. Further, the polyimide powder has a specific surface area of 1 m²/g or more, preferably 10 m²/g or more, most preferably 100 m²/g. In general, the specific surface area does not exceed 500 m²/g.

If the packed bulk density exceeds 600 g/l and the specific surface area is less than 1 m²/g, the characteristics to be spherical and porous are lost and the usefulness of the powder decreases. Further, if the packed bulk density is less than 100 g/l, the powder is too porous and, as a result, the strength is poor and the particle form cannot be maintained.

A process for preparing polyimide powder of the present invention comprises the steps of:

(1) polymerizing at least one aromatic tetracarboxylic acid dianhydride which forms an infusible insoluble polyimide and an approximately equimolar amount of at least one aromatic polyisocyanate in an organic solvent at a temperature of 100° to 200° C. to form polyimide particles in the form of slurry;

(2) filtering or centrifuging the polyimide particles; and (3) washing the resulting polyimide particles with an organic solvent.

This process has an advantage that a spherical porous polyimide powder in the form of fine particles can be easily produced without crushing step as compared to the conventional process for preparing a polyimide powder.

In the step (1) of the above process, i.e., the step of polymerizing the aromatic tetracarboxylic acid dianhydride and the aromatic polyisocyanate under heating to form polyimide particles in the form of slurry, the polymerization must be carried out using a specific catalyst, particularly a tertiary amine.

The above process can of course produce a spherical porous polyimide powder in the form of fine particles without using the catalyst. However, if the catalyst is not used, the degree of porosity is too large and the desired polyimide powder having a good mechanical strength cannot be obtained.

On the other hand, if the polymerization is carried out using the specific catalyst, the polyimide powder obtained has a suitable porosity.

Figure 4:
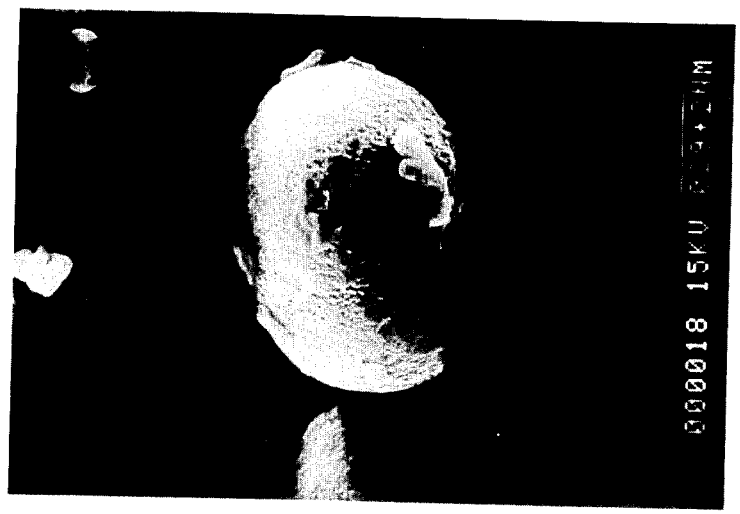
FIG. 4 is an electron micrograph (×5,000) of polyimide powder according to the present invention.
Figure 5:
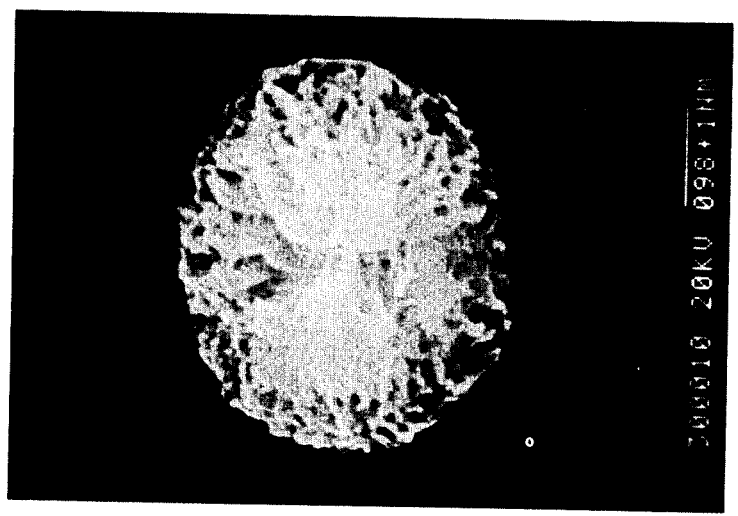
FIG. 5 is an electron micrograph (×15,000) of polyimide powder for the sake of comparison.

FIG. 4 is a scanning type electron micrograph (×5,000) of the polyimide powder obtained by the above process in which the catalyst was used, and FIG. 5 is a scanning type electron micrograph (×15,000) of the polyimide powder obtained by the above process in which the catalyst was not used.

If the catalyst is not used, the powder obtained is too porous and has a small mechanical strength, resulting in being difficult to maintain the particle form. On the other hand, if the catalyst is used, the powder obtained has a suitable degree of porosity and has a mechanical strength sufficient to maintain the particle form.

Thus, use of the tertiary amine catalyst can provide not only good result on achieving a suitable porosity but good result in the yield of the polyimide powder.

Each step in the above process will be further explained below.

The aromatic tetracarboxylic acid dianhydride and the aromatic polyisocyanate used in the step (1) may be properly selected so long as they form, through polymerization reaction, a polyimide which (1) does not melt at a temperature up to 500° C., (2) decomposes without melting when heated above 500° C., and (3) does not dissolve in polar solvents (e.g., polar solvents as used in the polymerization reaction of step (1) described after) and other solvents. The selection is obvious to one skilled in the art of the field of infusible and insoluble polyimide resin.

The formation of an infusible insoluble polyimide is determined by either the aromatic polyisocyanate, or by the combination of both. The combination of 3,4,4',4'-benzophenonetetracarboxylic acid dianhydride and a mixture of tolyene diisocyanate and diphenylmethane-4,4'-diisocyanate as used in the above-described process is excluded in the present invention because such provides a polyimide powder which is thermoplastic or soluble in organic solvents.

Examples of the aromatic tetracarboxylic acid dianhydride useful in the present invention include:
pyromellitic acid dianhydride,
3,3',4,4'-benzophenonetetracarboxylic acid dianhydride,
3,3',4,4'-biphenyltetracarboxylic acid dianhydride,
2,3,3',4'-biphenyltetracarboxylic acid dianhydride,
2,3,6,7-naphthalenetetracarboxylic acid dianhydride,
1,2,5,6-naphthalenetetracarboxylic acid dianhydride,
1,4,5,8-naphthalenetetracarboxylic acid dianhydride,
2,2'-bis(3,4-dicarboxyphenyl) propane dianhydride,
bis-(3,4-dicarboxyphenyl) sulfonic acid dianhydride,
bis-(3,4-dicarboxyphenyl) ether dianhydride,
2,2'-bis(2,3-dicarboxyphenyl) propane dianhydride,
1,1'-bis(2,3-dicarboxyphenyl) ethane dianhydride,
benzene-1,2,3,4-tetracarboxylic acid dianhydride,
2,3,6,7-anthracenetetracarboxylic acid dianhydride, and
1,2,7,8-phenanthrenetetracarboxylic acid dianhydride.

Examples of the aromatic polyisocyanate useful in the present invention include:
p-phenylene diisocyanate,
m-phenylene diisocyanate,
diphenylmethane-4,4'-diisocyanate,
diphenylether-4,4'-diisocyanate,
diphenylpropane-4,4'-diisocyanate,
diphenylsulfone-4,4'-diisocyanate,
diphenylsulfone-3,3'-diisocyanate,
diphenyl-4,4'-diisocyanate,
3,3'-dimethyldiphenyl-4,4'-diisocyanate,
2,4-tolylene diisocyanate, and
2,5-tolylene diisocyanate.

In addition, a polyisocyanate containing isocyanate rings represented by the following formula:

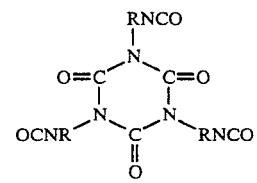

which are synthesized from diphenylmethane-4,4'-diisocyanate, tolylene diisocyanate, or xylene diisocyanate, and a poly(methylenephenylene) polyisocyanate (such as triphenylmethane-triisocyanate) represented by the following formula:

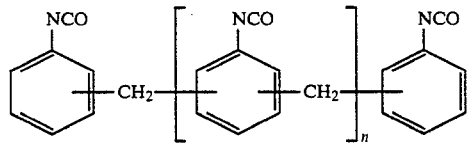

wherein n is an integer of 1 to 4, are useful in the present invention.

In the case of using the polyisocyanates, if those are used in a large amount, gelation occurs. Therefore, polyisocyanates are used in an amount up to 30 mole %.

One or more of the aromatic tetracarboxylic acid dianhydride and one or more of the aromatic polyisocyanate can be used in combination. The aromatic tetracarboxylic acid dianhydride and aromatic polyisocyanate are preferably used in nearly equimolar amounts, although a slight excess of either component is permissible.

The polymerization reaction of the aromatic tetracarboxylic acid dianhydride and the aromatic polyisocyanate is conducted using a catalyst such as a tertiary amine. The catalyst is used in an amount of 0.05 to 10 mole % per 1 mole of aromatic tetracarboxylic acid dianhydride employed.

Examples of the tertiary amine include pyridines such as pyridine, 2-chloropyridine, 2,4,6-corydine, 2,6-dichloropyridine, α,β,γ-picoline, 4-phenylpropylpyridine, 2-propylpyridine, 2,6-lutidine, 2,4-lutidine, 2,5-lutidine or 3,4-lutidine; aliphatic tertiary amines such as triethylamine, trimethylamine, N,N-dimethyldodecylamine, triethylenediamine or tri-n-butylamine; imidazoles having no active hydrogen such as 1-benzyl-2- methylimidazole, 1-cyanoethyl-2-methylimidazole, 1-cyanoethyl-2-phenylimidazole, 1-cyanoethyl-2-ethyl-4-methylimidazole or 1-cyanoethyl-2-undecylimidazole; aromatic tertiary amines such as N,N-dimethyl-p-toluidine or N,N-dimethylbenzylamine; 1,8-diazabicyclo(5,4,0)undecene-7 and an acid complex thereof; and the like.

Examples of the organic solvent used for the polymerization reaction include a polar solvent such as N-methyl-2-pyrrolidone, N,N-dimethylacetamide, N,N-dimethylformamide, dimethylsulfoxide, hexamethylphosphortriamide or N,N'-dimethyl-2-imidazolidinone; phenols such as cresol, phenol or xylenol; and the like. These solvents may be used in combination with an organic solvent such as hexane, benzene, toluene, and xylene.

The organic solvent should be used in such an amount that the concentration of the aromatic tetracarboxylic acid dianhydride and aromatic polyisocyanate is 5 to 80 wt%, and preferably 10 to 30 wt%, on a solid basis. If the concentration is excessively low, the reaction rate is slow. If the concentration is excessively high, it is difficult to control the exothermic reaction.

The polymerization reaction is carried out by adding the aromatic tetracarboxylic acid dianhydride, aromatic polyisocyanate, and tertiary amine catalyst to an organic solvent, with heating and stirring. In this step, the components dissolve in the solvent to form a uniform solution. As the polymerization reaction proceeds, the solution becomes viscous, and carbon dioxide gas is liberated. Then, polyimide particles separate out and precipitate in the form of slurry. The reaction is continued with heating and stirring for improved yields.

The polymerization reaction temperature should be 100° to 200° C. If it is lower than 100° C., the reaction rate is low and the resulting polyimide particles are excessively small in size. Thus, the reaction system becomes too thixotropic to be easily stirred. Moreover, such fine particles cannot be filtered out or centrifuged. As the reaction temperature becomes high, the reaction rate increases; but excessively high reaction rates tend to provide a polyimide powder containing large particles. Therefore, the upper limit should be 200° C. The most preferred temperature in view of particle diameter and other properties of polyimide powder and the reaction rate is 110° to 180° C.

The reaction time is preferably 1 to 8 hours although greatly varying depending on the components.

In step (2) of the process of the present invention the polyimide particles are filtered out or centrifuged from the slurry formed in step (1). A common filter or centrifuge is used in this step. The separated polyimide particles carry a small quantity of unreacted product and low molecular weight polymers, which cause blocking of particles in the heating and drying steps, making the particles coarse, and the desired polyimide powder in the form of fine particles cannot be obtained.

In step (3) of the present invention, the polyimide particles obtained in step (2) are washed with an organic solvent to remove the undesirable products and low molecular weight polymers. This step makes it possible to produce a polyimide powder of fine particles which is free of blocking. Thus, step (3) is very important and it differs from the common simple washing step.

Washing in the present invention is accomplished with a polar solvent such as N-methyl-2-pyrrolidone which dissolves unreacted products and low molecular weight polymers. It is preferable to wash again with a low boiling solvent such as acetone or methanol.

The resulting polyimide powder is then dried with heating at 100° to 300° C. for about 1 to 5 hours to remove the solvent, and the desired polyimide powder can be obtained.

The resulting powder has a spherical porous powder having the specified packed bulk density and specific surface area in the weight average particle diameter range of 1 to 20 μm and also has the inherent viscosity of the specified range. Further, the powder has the characteristic such that it does not melt during baking at high temperature and does not dissolve in a polar solvent.

The invention is now described in more detail with reference to the following examples which are in no way intended to limit the scope of the present invention.

EXAMPLE 1

32.2 g (0.1 mole) of 3,3',4,4'-benzophenonetetracarboxylic acid dianhydride was dissolved in 224 g of N-methyl-2-pyrrolidone (hereinafter "NMP"). To this solution was added 0.2 g of dimethylbenzyl amine with stirring and heating at 140° C. to sufficiently disperse. When 25.0 g (0.1 mole) of diphenylmethane-4,4'-diisocyanate was gradually added thereto, the solution vigorously liberated carbon dioxide gas. After stirring for 10 minutes, polyimide particles separated out in the form of slurry. The polymerization reaction was further continued for 5 hours at the same temperature.

After the reaction, the reaction product was cooled and the polyimide particles were filtered out, followed by washing three times with NMP. The washed polyamide powder was dried by heating at 250° C. for 3 hours. In this manner, 44.6 g (92.1 wt% yield) of spherical porous polyimide powder were obtained.

This polyimide powder had a packed bulk density of 370 g/l and a specific surface area of 15.2 m$^2$/g. Further, the polyimide had an inherent viscosity of 0.36. FIG. 4 shows a scanning type electron micrograph of this polyimide powder.

COMPARATIVE EXAMPLE 1

Example 1 was followed except that 0.2 g of dimethylbenzyl amine was not used in the polymerization reaction of the dianhydride and diisocyanate to obtain 30.3 g (62.5 wt% yield) of the polyimide powder.

This polyimide powder had a weight average particle diameter of 4.2 μm and a specific surface area of 36 m$^2$/g. Further, the polyimide which constitutes the powder had an inherent viscosity of 0.28. The infrared absorption spectrum by the KBr method gave absorption by the carbonyl of the imide group at 1720 cm$^{-1}$ and 1780 cm$^{-1}$. FIG. 5 shows a scanning type electron micrograph of this polyimide powder.

EXAMPLE 2

Into a 300 ml four-neck flask were charged 21.8 g (0.1 mole) of pyromellitic dianhydride, 26.4 g (0.1 mole) of 3,3'-dimethyldiphenyl-4,4'-diisocyanate, 200 g of N-methyl-2-pyrrolidone (NMP), and 0.2 g of 1,8-diazabicyclo(5,4,0)-undecene-7 (DBU). The reactants were heated with stirring until a clear solution was formed. On heating at 130° to 132° C. for about 10 minutes, the solution liberated carbon dioxide gas and became viscous. 20 minutes later the solution became suddenly turbid, and polyimide particles separated out and precipitated in the form of slurry. The polymerization reaction was continued for 5 hours at the same temperature.

After the reaction, the reaction product was cooled and the polyimide particles were filtered out, followed by washing three times with NMP and then twice with acetone. The washed polyimide powder was dried by heating at 250° C. for 3 hours. In this manner, 37.2 g (95.3 wt% yield) of spherical porous polyimide powder were obtained.

This polyimide powder had a weight average particle diameter of 4.8 μm. The polyimide had an inherent viscosity of 0.53. The infrared absorption spectrum by the KBr method gave absorption by the carbonyl of the imide group at 1720 cm$^{-1}$ and 1780 cm$^{-1}$. Further, the polyimide powder had a packed bulk density of 380 g/l and a specific surface area of 35.2 m$^2$/g.

This polyimide powder did not melt when heated to 500° C. and did not dissolve in various solvents except NMP.

EXAMPLE 3

Into a 300 ml four-neck flask were charged 21.8 g (0.1 mole) of pyromellitic dianhydride, 25.2 g (0.1 mole) of diphenylether diisocyanate, 200 g of NMP, 20 g of xylene and 0.2 g of triethylene diamine. The reactants were heated with stirring until a clear solution was formed. On heating at 150° to 152° C. for about 5 minutes, the solution vigorously liberated carbon dioxide gas. 10 minutes later, the solution became suddenly turbid, and polyimide particles separated out and precipitated in the form of slurry. The polymerization reaction was continued for 4 hours at the same temperature.

After the same filtering, washing, and drying operations as in Example 2, 37.2 g (97.4 wt% yield) of spherical porous polyimide powder was obtained.

This polyimide powder had a weight average particle diameter of 5.2 μm. The polyimide had an inherent viscosity of 0.35. The infrared absorption spectrum gave absorption by the carbonyl of the imide group. Further, the powder had a packed bulk density of 339 g/l and a specific surface area of 31.8 m$^2$/g. This polyimide powder was infusible and insoluble.

EXAMPLE 4

29.4 g (0.1 mole) of 3,3',4,4'-biphenyltetracarboxylic acid dianhydride and 223 g of NMP were stirred with heating at 130° C. until a uniform solution was formed. 26.4 g (0.1 mole) of 3,3'-dimethyldiphenyl-4,4'-diisocyanate was added, and then 0.2 g of N,N'-dimethyl-p-toluidine and 20 g of xylene were added. On stirring with heating at 130° C. for 10 minutes, polyimide particles separated out and precipitated in the form of slurry. The polymerization reaction was continued for 5 hours at the same temperature.

After the same filtering, washing and drying operations as in Example 2, 46.0 g (97.0 wt% yield) of spherical porous polyimide powder were obtained.

This polyimide powder had a weight average particle diameter of 4.5 μm. The polyimide had an inherent viscosity of 0.71. The infrared absorption spectrum gave absorption by the carbonyl of the imide group. Further, the powder had a packed bulk density of 348 g/l and a specific surface area of 37.0 m$^2$/g. This polyimide powder was infusible and insoluble. FIG. 1 shows an infrared spectrum of this polyimide powder.

EXAMPLE 5

Into a 400 ml four-neck flask were charged 29.4 g (0.1 mole) of 3,3',4,4'-biphenyltetracarboxylic acid dianhydride and 218 g of N,N-dimethylformamide. The reactants were heated at 120° C. with stirring until a uniform solution was formed. 25.0 g (0.1 mole) of diphenylmethane-4,4'-diisocyanate and 0.2 g of N,N'-dimethyl-p-toluidine were added. The solution liberated carbon dioxide gas. After stirring for about 15 minutes, polyimide particles separated out and precipitated in the form of slurry. The polymerization reaction was continued for 5 hours at 120° to 122° C.

After the same filtering, washing, and drying operations as in Example 2, 45.2 g (98.7 wt% yield) of spherical porous polyimide powder were obtained.

Figure 2:
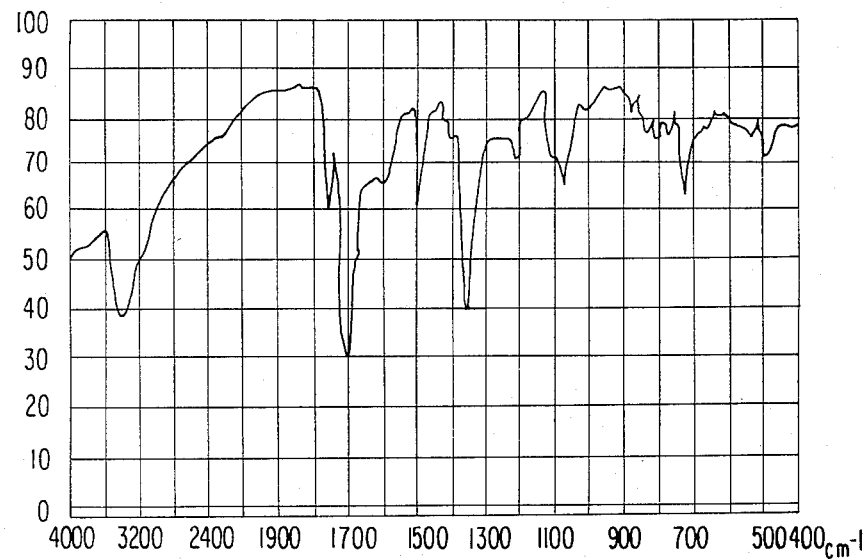

This polyimide powder had a weight average particle diameter of 5.2 μm. The polyimide had an inherent viscosity of 0.3. The infrared absorption spectrum gave absorption by the carbonyl of the imide group. Further, the powder had a packed bulk density of 352 g/l and a specific surface area of 30.4 m$^2$/g. This polyimide powder was infusible and insoluble. FIG. 2 is an infrared spectrum of this polyimide powder.

EXAMPLE 6

32.2 g (0.1 mole) of 3,3',4,4'-benzophenonetetracarboxylic acid dianhydride was dissolved in 224 g of N,N-dimethylacetamide and 20 g of xylene. To this solution were added 19.1 g (0.05 mole) of triphenylmethane-triisocyanate, 12.5 g (0.05 mole) of diphenylmethane-4,4'-diisocyanate, and 0.2 g of 1-cyanoethyl-2-undecylimidazole with stirring and heating at 140° C. On heating at 140° to 142° C. for 5 minutes, the solution vigorously liberated carbon dioxide gas, and polyimide particles separated out and precipitated in the form of slurry. The polymerization reaction was continued for 5 hours at the same temperature.

After the same filtering, washing and drying operations as in Example 2, 53.8 g (92.5 wt% yield) of spherical porous polyimide powder were obtained.

This polyimide powder had a weight particle diameter of 6.2 μm. The polyimide had an inherent viscosity of 0.36. The infrared absorption spectrum gave the absorption by the carbonyl of the imide group. Further, the powder had a packed bulk density of 330 g/l and a specific surface area of 24.9 m$^2$/g. This polyimide powder was infusible and insoluble.

EXAMPLE 7

32.2 g (0.1 mole) of 3,3',4,4'-benzophenonetetracarboxylic acid dianhydride was dissolved in 232 g of NMP. To this solution were added 26.4 g (0.1 mole) of 3,3'-dimethyldiphenyl-4,4'-diisocyanate, 0.2 g of N,N'-dimethyl-p-toluidine, and 20 g of xylene with stirring and heating at 130° C. On heating at 130° C. for 10 minutes, the solution liberated carbon dioxide gas, and polyimide particles separated out and precipitated in the form of slurry. The polymerization reaction was continued for 5 hours at the same temperature.

After the same filtering, washing and drying, operations as in Example 2, 45.0 g (90.4 wt% yield) of spherical porous polyimide powder were obtained.

Figure 3:
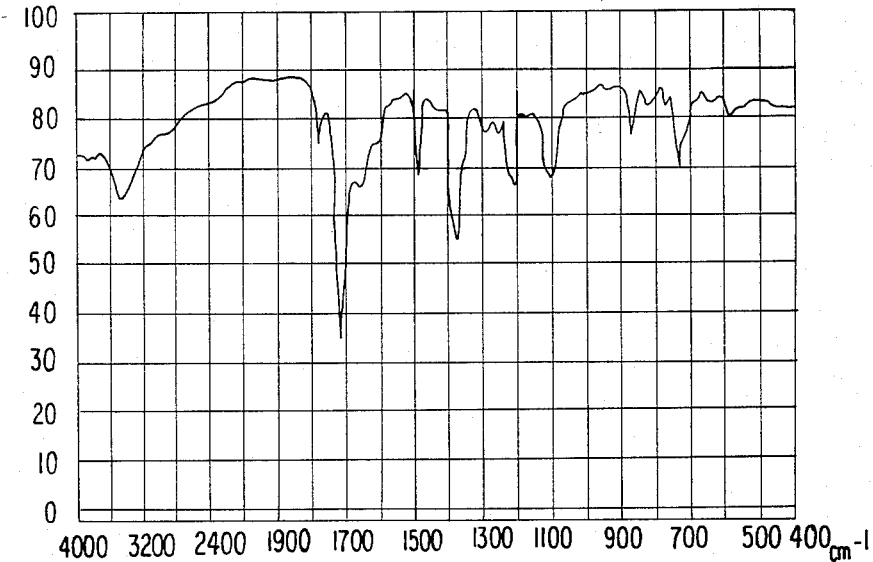

This polyimide powder had a weight average particle diameter of 2.1 μm. The polyimide had an inherent viscosity of 0.49. The infrared absorption spectrum gave absorption by the carbonyl of the imide group. Further, the powder had a packed bulk density of 350 g/l and a specific surface area of 49.4 m²/g. This polyimide powder was infusible and insoluble. FIG. 3 is an infrared absorption spectrum of this polyimide powder.

COMPARATIVE EXAMPLE 2

29.8 g (0.1 mole) of 3,3',4,4'-biphenyltetracarboxylic acid dianhydride and 223 g of NMP were dissolved by stirring and heating at 120° C. to make a uniform solution. To this solution were added 26.4 g (0.1 mole) of 3,3'-dimethyldiphenyl-4,4'-diisocyanate and 0.2 g of N,N'-dimethyl-p-toluidine. When heated with stirring at 80° C. for about 30 minutes, the solution became turbid and gradually turned into a paste. The polymerization reaction was continued for 1 hour at the same temperature. The reaction product became so thixotropic that it was difficult to perform stirring. The polymerization reaction was further continued for 1 hour and then the reaction product was heated at about 150° C. for 3 hours.

After the reaction, an attempt was made to separate the polyimide particles by suction filtration or centrifugation, but separation was impossible. The reaction product in the form of paste was placed in acetone and the resulting precipitate was filtered out. After crushing, the desired polyimide powder was obtained. However, the particles of the polyimide powder were not spherical nor porous and remarkable aggregation of particles was appeared.

The reason that polyimide powder obtained in the above method tends to form aggregates is as follows. That is, when the slurry containing the polymerization product is introduced into acetone, a polyimide of high molecular weight separates out together with low molecular weight polymers and unreacted products which are entrapped in the polyimide particles and are not easily removed in the subsequent washing step. In the subsequent heating and drying step, these impurities cause the blocking of the powder particles.

In contrast, in the process of the present invention, the polyimide particles are separated directly from the slurry and the low molecular weight polymer remaining on the particles is removed in the washing step. Therefore, the powder particles do not aggregate and stay in the form of a porous sphere.

While the invention has been described in detail and with reference to specific embodiments thereof, it will be apparent to one skilled in the art that various changes and modifications can be made therein without departing from the spirit and scope thereof.

What is claimed is:

1. A spherical porous polyimide powder which is thermally infusible and is insoluble in an organic solvent, comprising spherical porous particles of a weight average particle diameter of 1 to 20 μm comprising an aromatic polyimide having an inherent viscosity measured in sulfuric acid at a concentration of 0.5 g/dl at temperature of 30±0.01° C. of 0.1 to 2.0, wherein a packed bulk density is 100 to 600 g/l and a specific surface area measured by a nitrogen absorption method is 1 m²/g or more.

2. The spherical porous polyimide powder as claimed in claim 1, wherein the weight average particle diameter is 1 to 15 μm.

3. The spherical porous polyimide powder as claimed in claim 1, wherein the weight average particle diameter is 1 to 10 μm.

4. The spherical porous polyimide powder as claimed in claim 1, wherein the inherent viscosity is 0.2 to 1.0.

5. The spherical porous polyimide powder as claimed in claim 1, wherein the inherent viscosity is 0.3 to 0.8.

6. The spherical porous polyimide powder as claimed in claim 1, wherein the packed bulk density is 200 to 500 g/l.

7. The spherical porous polyimide powder as claimed in claim 1, wherein the packed bulk density is 300 to 400 g/l.

8. The spherical porous polyimide powder as claimed in claim 1, wherein the specific surface area is 10 m²/g or more.

9. The spherical porous polyimide powder as claimed in claim 1, wherein the specific surface area is 100 m²/g or more.

10. The spherical porous polyimide powder as claimed in claim 1, wherein the specific surface area is up to 500 m²/g.

* * * * *